July 1, 1930.  T. KASKOURAS  1,768,693
BUTTER CUTTING MACHINE
Filed Oct. 4, 1926   2 Sheets-Sheet 1
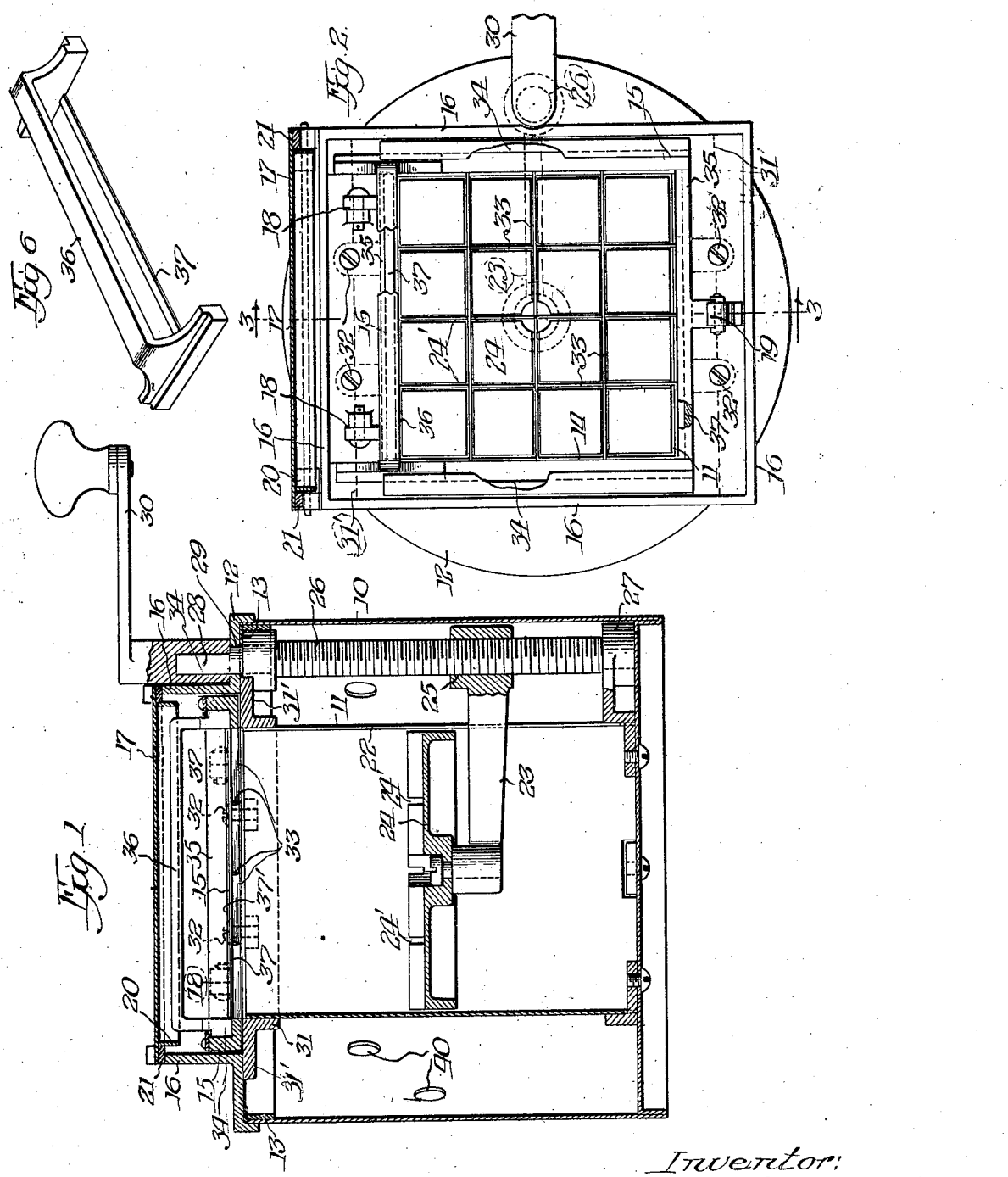
Inventor:
Thomas Kaskouras
By Otto M. Nermig

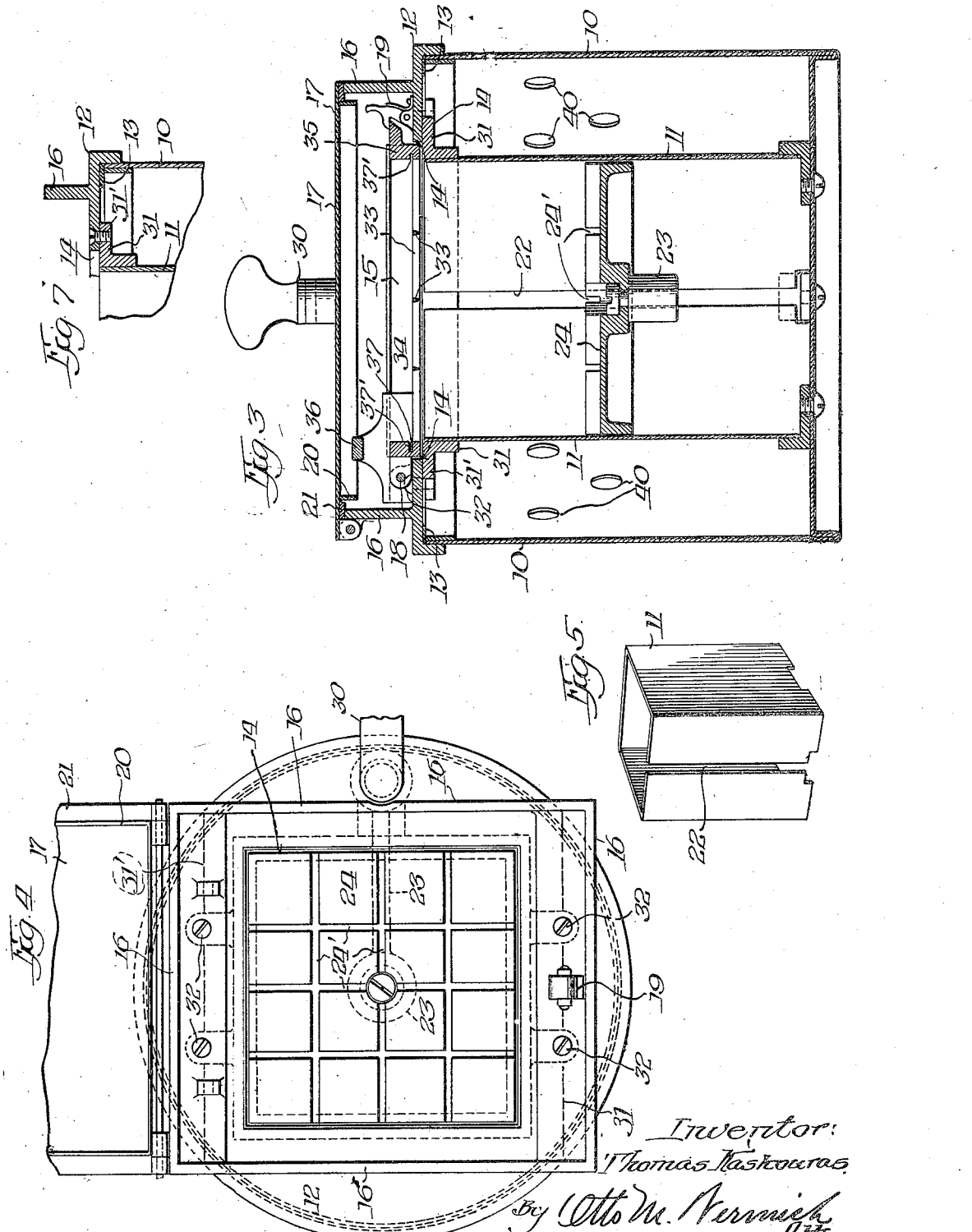

Patented July 1, 1930

1,768,693

UNITED STATES PATENT OFFICE

THOMAS KASKOURAS, OF CHICAGO, ILLINOIS

BUTTER-CUTTING MACHINE

Application filed October 4, 1926. Serial No. 139,240.

The invention relates to butter dispensing machines and has among its various objects the provision of a simple means for feeding the butter to a butter cutting and severing means and also the provision of a butter cutting and severing means which will effectively cut and sever the butter without causing one cut and severed piece to contact and adhere to another during the cutting and severing operation.

The invention has as a further object the provision of a cover for a butter container which cover is constructed to provide a means for supporting a butter cutting and severing device so that said cutting and severing device may be moved within the cover to cut and sever the butter and also be arranged to expose the butter container to allow the latter to be charged with butter and again be arranged to perform the cutting and severing of the butter.

In addition to the above it is an object to construct the cover so that it and the butter contained in a receptacle provided therefor will cooperate with each other to form a cooling chamber in which water will be confined to thereby retain the butter in a cool condition and in condition to facilitate the cutting and severing thereof.

It is a further object of the invention to provide a butter dispensing machine having an outer casing or receptacle within which is located a butter container and a rotatable element which is operable from the outside of the outer casing to actuate a butter feeding element operable within the container, the rotatable element being located exteriorly of the butter container.

The invention has these and other objects all of which will be explained in detail and more readily understood when read in conjunction with the accompanying drawings which illustrate one embodiment of which the invention is susceptible it being obvious, however, that changes and modifications may be resorted to without departing from the spirit of the appended claims forming a part hereof.

Fig. 1 is a central vertical sectional view of a butter cutter embodying the features of the invention.

Fig. 2 is a plan view of the structure shown in Fig. 1 with the closure for the cover employed in the structure shown in section for the purpose of illustration.

Fig. 3 is a sectional view of a portion of the structure shown in Fig. 1 taken on line 3—3 of Fig. 2.

Fig. 4 is a plan view of the device shown in Fig. 1 with the butter cutting and severing device removed and the closure for the cover arranged in an open position.

Fig. 5 is a side elevation of the butter container and

Fig. 6 is a perspective view of one of the elements of the butter cutting and severing mechanism.

Fig. 7 is an enlarged sectional view of a detail of construction.

The device illustrated includes an outer casing or receptacle 10 within which is located a butter container which is of rectangular cross section. A cover 12 is provided to close the receptacle 10 and a suitable packing 13 is arranged between the cover and receptacle to prevent the escape of cool air at this point from within the receptacle. The butter container 11 is located within the receptacle 10 and the upper end thereof communicates with an opening 14 provided in the cover within which a butter severing and cutting mechanism generally designated 15 is mounted. This cover 12 is provided with a rectangular flange 16 which is of sufficient height to, with the cooperation of the lid 17, provide a housing for the butter and severing mechanism arranged therein. The butter cutting and severing mechanism 15 is hinged at 18 to the cover and a holding means 19 is provided to releasably lock the butter severing device in position in the opening 14 across the end of the butter container 11. The lid 17 is provided with a flange 20 and a packing ring 21, the latter of which cooperates with the rectangular flange 16 of the cover to assist in retaining cool air in the receptacle 10, it being understood that the receptacle may, when in use, be arranged within another receptacle which is cooled by a suitable refrigerant. The butter container 11 has one wall thereof provided with a slot 22 and is thus formed to provide a means within which an arm 23, which is part of a butter feed 24, operates. A face of the feeder 24 is provided with slots 24' for the reception of the cutters 33 of the butter severing device. This arm 23 is provided with an internally threaded portion 25 provided to secure it to the feed screw 26 one end of which is rotatably mounted in the bracket 27 and has its opposite end such as 28 extended through an opening 29 in the cover. This end of the feed screw is formed to allow a handle 30 to be detachably connected to the feed screw. The upper end of the butter container 11 is provided with a frame 31 which is fastened to the cover 12 by means of screws such as 32. This frame 31 which is preferably rectangular in outline is provided with the laterally projecting flange 31' which abuts against the material of the cover which surrounds the opening 14 provided in the cover and cooperates therewith and the butter provided in the container 11 to retain water within the cover above the butter to thus maintain the butter in a cool condition and in a condition in which the cutting and severing of the butter will be facilitated.

The connection of the butter feeder 24 with the feed screw 26 will, upon rotation of the feed screw, cause the butter to be fed through the butter cutting mechanism and cause it to be divided into portions of the proper width. The frame of the butter cutting and severing device generally designated 15, is of rectangular formation and is provided with the transversely arranged cutter blades 33—33 which are of a suitable width so as to provide a means for supporting the butter during the butter severing operation. The frame of the butter cutting device is as previously stated rectangular in outline and opposed sides are respectively formed to provide guideways 34—34 and stops 35—35. The guideways 34 are provided to receive the ends of a frame 36 which carries a cutter blade 37 which travels across the blades 33—33 and severs the butter divided by the cutter blades. The stops 35—35 are recessed as indicated at 37' to receive the cutter blade 37 when the latter reaches the limit of movement in either direction. The outer receptacle 10 is provided with a plurality of openings 40 employed for the purpose of allowing cool air to enter said receptacle.

From the foregoing description of the construction and operation of the device it is manifest that as the handle and screw threaded member 26 are rotated, that the conveying element 24 will be actuated along and within the container which feeds the butter to be cut toward the blades 33—33 which cut the butter lengthwise. It is further evident that when the butter has been moved the required distance by the conveyor and the severing means carried by the frame is actuated along the guides 34 that the butter which has been previously divided by the cutting blades will be severed into small distinct pieces of a size suitable for serving.

It is also evident that the use of blades for dividing the butter reduces the possibility of stretching of the cutters and breaking and also serves to support the butter laterally during the severing operation which results in preventing contact and adherence of the pieces of butter during the severing operation. It is further manifest that by hinging the butter cutter frame to the cover that access to the butter container is thereby facilitated.

In addition it is evident that by constructing the cover and certain elements connected therewith so that water may be retained in the cover above and in contact with the butter said butter is maintained in a cool and proper condition for serving and also cutting and severing.

Having thus described the invention what I claim and desire to cover by Letters Patent is:—

1. In a butter cutting machine the combination of a container for the butter to be cut, a housing located at one end of the container, butter cutting means and a butter severing means arranged in the housing and extending across the end of the container, means for feeding the butter toward the cutting and severing means, said means including an element arranged within the container for conveying the butter through the container and means located outside of the container for carrying and actuating said element arranged within the container, said housing and the butter located in the container providing means for retaining a liquid cooling medium in said housing.

2. In a butter cutting machine the combination of a butter container, a butter cooling chamber arranged adjacent the container in which a cooling agent is located and a butter severing device located in said chamber, said container and chamber being connected with each other to provide a fluid tight connection between them.

3. In a butter cutting machine the combination of a butter container, a butter cooling chamber arranged adjacent the container in which a liquid cooling medium is adapted to be located and retained, a butter cutting device extending across the container and a butter severing device operable in said cooling chamber.

4. In a butter cutting device the combination of a butter container, a chamber arranged at one end of said container, said chamber and the butter provided in the container cooperating to retain a liquid cooling medium in said chamber.

5. In a butter cutting machine the combination of a butter container and a chamber arranged at one end of the container, a butter cutting device and a butter severing means located in said chamber, said chamber container and butter in said container cooperating to maintain a liquid cooling medium above said butter and within said chamber.

6. In a butter cutting machine, the combination of a butter container, means for conveying butter through said container, a member arranged at an end of the container, an upwardly extending annular flange projecting from said member providing side walls of a chamber, a closure for said chamber, butter cutting means arranged to extend across the container, said member, flange and butter providing a chamber in which a cooling medium may be retained in contact with the butter.

7. In a butter cutting machine, the combination of a container for the butter to be cut, a housing located at one end of the container, a fluid-tight connection provided between said container and housing, a butter cutting means and a butter severing means arranged in the housing and extending across the end of the container, means for feeding the butter toward the cutting and severing means, said means including an element arranged within the container for conveying the butter through the container and threaded rotatable means located outside of the container for carrying and actuating said element arranged within the container, said severing means being reciprocably connected with the cutting means and said cutting means being located within the housing to permit the cutter and severing means to be arranged in operative position across the container and to permit of access to the interior thereof.

8. In a device of the character described, the combination of a butter container, a cooling chamber located at one end of the container, butter cutting means located in the chamber, and means for feeding the butter through said container endwise thereof to the cutting means, said butter providing a seal between the container and chamber to prevent escape of a cooling medium located in said chamber.

9. In a device of the character described, the combination of a casing, a butter container located in said casing, a cooling chamber located at one end of said container, butter cutting means arranged in said chamber, and means for feeding the butter from said container to the cutting means located in the chamber, the butter arranged in the container providing a seal between the container and chamber to prevent the escape of a cooling medium from the chamber.

10. In a device of the character described, the combination of a casing, a butter container located in the casing, a member extending between said container and casing, said member being provided with an opening with which said container communicates, a butter cutter extending across the end of the container and across the opening in said member, a cooling chamber provided at said end of the container, and means for feeding the butter from the container through the opening in said member and into the chamber.

11. In a device of the character described, the combination of a container, a casing in which the container is arranged, a member extending between the container and casing providing a cover for said casing, said member being provided with an opening with which the container communicates, said cover member and container having means providing a fluid tight connection between them, a butter cutter located at said opening, said cover member being constructed to provide a chamber, and means located in the container for feeding the butter from the container into engagement with the cutter and into the chamber.

12. In a device of the character described, the combination of a container, a casing in which the container is arranged, a member extending between the container and casing providing a cover for said casing, said member being provided with an opening with which the container communicates, means providing a fluid-tight connection between said cover member and said container, a butter cutter located at said opening, said cover member being constructed to provide a chamber, means located in the container for feeding the butter from the container into engagement with the cutter and into the chamber, and means arranged between the container and casing for moving said means located in said container.

13. In a butter cutting machine, the combination of a container for the butter to be cut, a housing located at one end of the container, said housing having an opening into which an end of the container projects, and having an annular portion extending from the container to a wall of the housing, butter cutting means including a frame supported by said annular portion, a butter severing means slidably mounted upon said cutter frame, means located in said container for moving the butter toward the cutter and means for actuating said means.

In witness whereof, I hereunto subscribe my name this 7th day of September, A. D. 1926.

THOMAS KASKOURAS.